United States Patent [19]
Rockwell

[11] Patent Number: 5,891,489
[45] Date of Patent: Apr. 6, 1999

[54] APPARATUS AND METHOD FOR MOLDING FISH BAIT ON A FISH HOOK

[76] Inventor: Kirk Rockwell, 4064 E. Ave. S. 12, Palmdale, Calif. 93552

[21] Appl. No.: 748,084
[22] Filed: Nov. 13, 1996
[51] Int. Cl.⁶ .................................................. A23P 1/10
[52] U.S. Cl. .............................. 426/1; 426/512; 425/117; 425/195; 425/256; 425/449
[58] Field of Search .................. 426/1, 2, 512, 426/516; 425/117, 195, 256, 449

[56] References Cited

U.S. PATENT DOCUMENTS

| | | | |
|---|---|---|---|
| 2,434,220 | 1/1948 | Muir et al. | 99/3 |
| 2,449,322 | 9/1948 | Richardson | 99/3 |
| 2,559,434 | 7/1951 | Hyland | 146/150 |
| 2,827,376 | 3/1958 | Breuer | 99/3 |
| 2,914,408 | 11/1959 | Buzard | 99/3 |
| 3,047,975 | 8/1962 | Pretorius | 43/42.06 |
| 3,191,336 | 6/1965 | Cordell, Jr. | 43/42.24 |
| 3,322,544 | 5/1967 | Yakstis | 99/3 |
| 3,846,931 | 11/1974 | Block et al. | 43/42.53 |
| 3,934,038 | 1/1976 | Kern | 426/1 |
| 4,108,955 | 8/1978 | Thom | 264/222 |
| 5,063,703 | 11/1991 | Riley | 43/42.06 |

Primary Examiner—Milton Cano
Attorney, Agent, or Firm—Dennis W. Beech

[57] ABSTRACT

The fish bait molder is a two element mold in which one mold element is inserted into the other in a manner that the fish bait molder may be opened and closed. Each mold element has a portion of a mold cavity such that when the two mold elements are closed together a mold cavity is formed. An access port is contained in one of the two mold elements to allow insertion of a fish hook and removal of a baited fish hook. A slot is provided to allow a fish line to protrude out of the fish bait molder. There is a bait holder with a bait cavity attached to one of the mold elements. The bait cavity is filled with fish bait and a piston slides in the bait cavity to force the fish bait through an inlet passage into the mold cavity and around the fish hook. The piston can be operated by rotating the bait holder into a fish bait container having a threaded lid or rotating a rotational injector with a piston attached into the bait cavity. A ratchet mechanism may also be used to force the piston into the bait cavity.

17 Claims, 3 Drawing Sheets

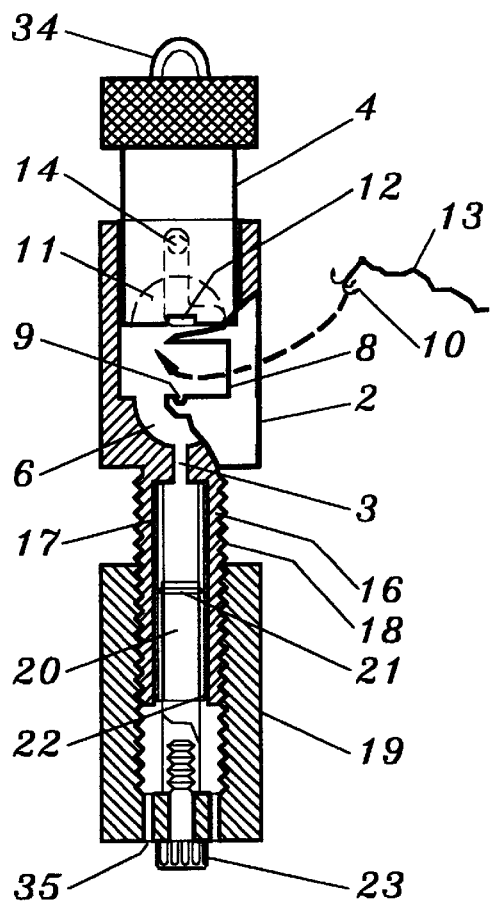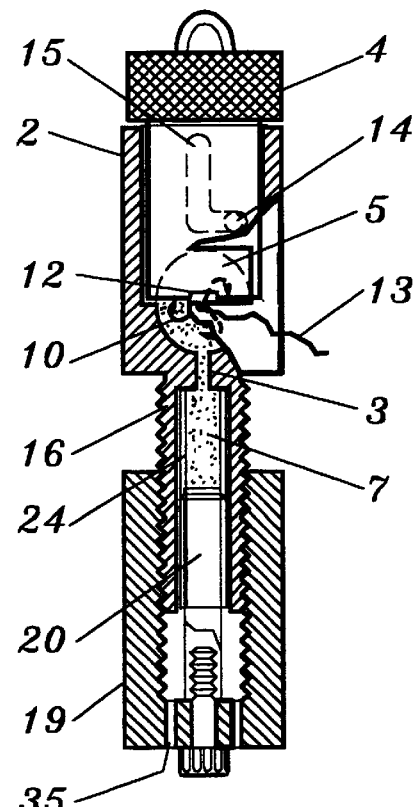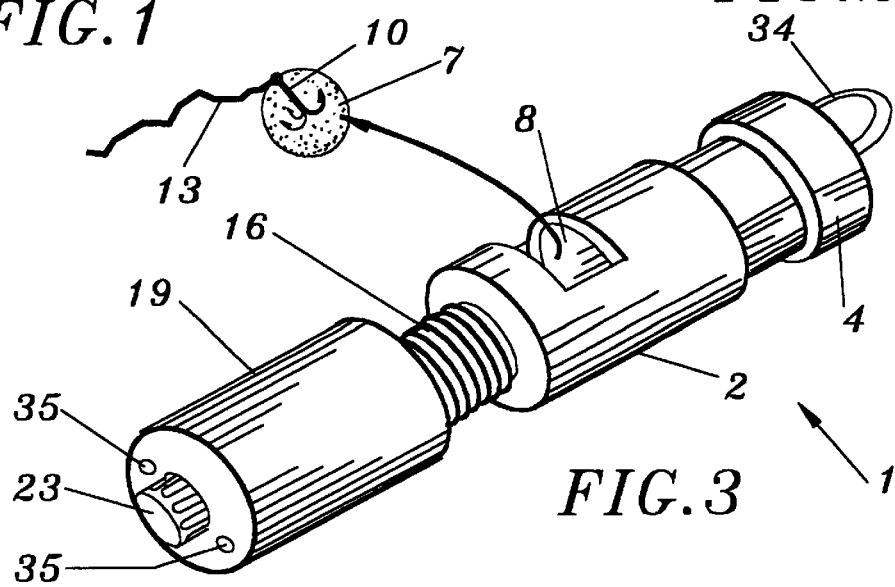

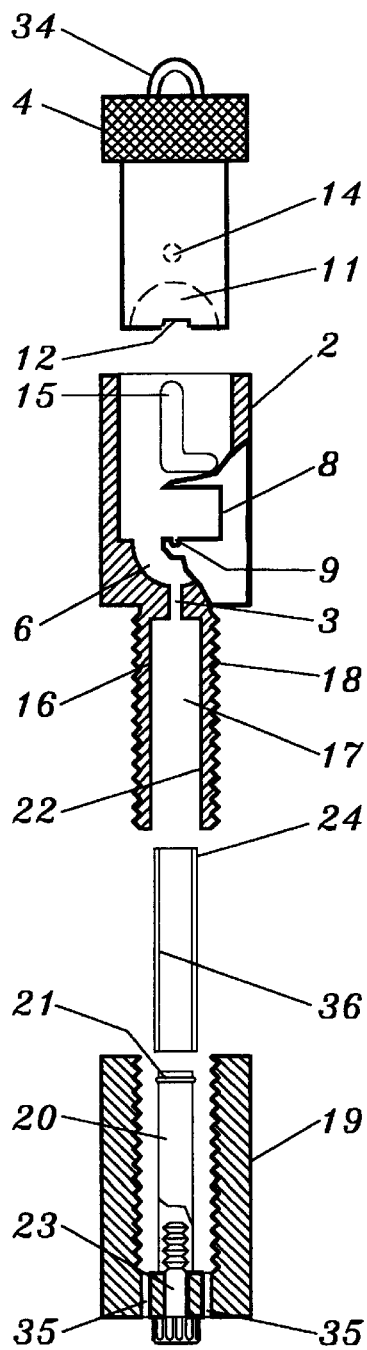
FIG.4
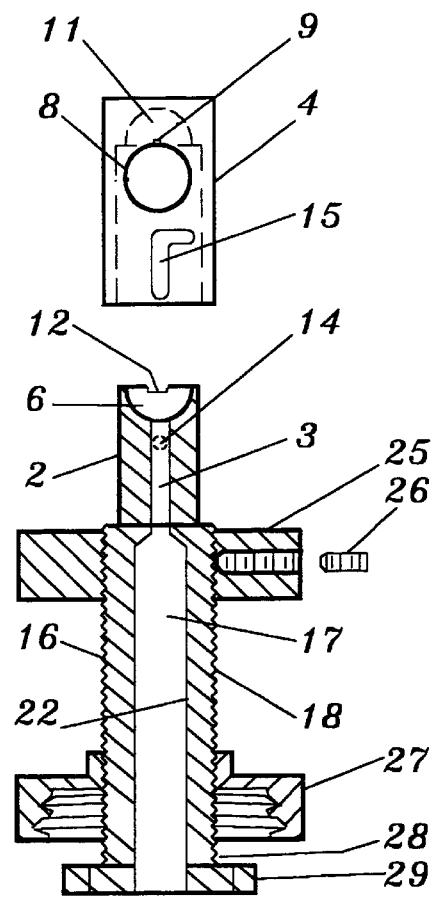
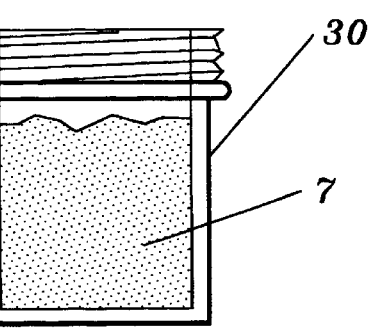
FIG.5

APPARATUS AND METHOD FOR MOLDING FISH BAIT ON A FISH HOOK

BACKGROUND OF THE INVENTION

1. Field of the Invention

This invention relates to apparatus and methods used to mold or form fish bait on a fish hook. The new apparatus provides a means to mold fish bait on a hook without the fisherman having to physically touch the fish bait.

2. Description of Related Art

There are currently in use various devices, apparatus and methods to form fish bait into a lure and/or place the bait on a fish hook. Generally these approaches tend to form or shape the fish bait prior to placing it on the fish hook. Common examples include mixing and placing the fish bait in containers or packages from which the bait may be removed to fit on the hook. Such methods including using pressurized containers containing bait which may then be extruded in the shape of a worm. The bait is then placed on the fish hook.

Other approaches include mixing the bait composition such that it may be cut into various shapes for use as fishing bait and as a lure. In addition there are simple apparatus similar to a syringe without a needle end which has the tube open at one end such that it may be pushed into a malleable fish bait composition to fill the tube. The fish hook may then be pressed into the fish bait and the piston used to force the fish bait and hook from the syringe tube. In this method a cylindrical shaped form of fish bait is attached to the fish hook. In this particular method the bait on the fish hook does not have to be touched by the user; however, the outside of the syringe has fish bait residue. In all of these known methods contamination of the fish bait may occur by the user touching the apparatus or the bait itself. Thus human scent may be imported to the bait and the user may have fish bait on their hands as well as other areas.

The present invention provides an apparatus and method of forming the fish bait on a fish hook which minimizes the chances of the user touching the bait. By not contaminating the bait the scent intended to attract the fish is not compromised. In addition the user may bait fish hooks and fish without the need to continually clean up any fish bait residue which might result from handling the bait.

SUMMARY OF THE INVENTION

A primary objective of the present invention is to provide for molding or forming malleable or plastic (in the fluidity sense) fish bait on a fish hook. A further object is to provide for molding the fish bait in a desired shape. It is yet another object of this invention to provide a method to mold fish bait to a fish hook. It is a further object to extract fish bait directly from a fish bait container into the mold to attach the bait to the fish hook.

In accordance with the description presented herein, other objectives of this invention will become apparent when the description and drawings are reviewed.

BRIEF DESCRIPTION OF THE DRAWING

FIG. 1 illustrates a side elevation cross sectional view of the fish bait molder open to receive a fish hook.

FIG. 2 illustrates a side elevation cross sectional view of the fish bait molder closed.

FIG. 3 illustrates a perspective view of the fish bait molder with baited hook removed.

FIG. 4 illustrates a side elevation exploded view of the elements of the fish bait molder.

FIG. 5 illustrates a side elevation exploded view of the fish bait molder adapted for attachment to a bait container.

DESCRIPTION OF THE PREFERRED EMBODIMENT

Figure 6:
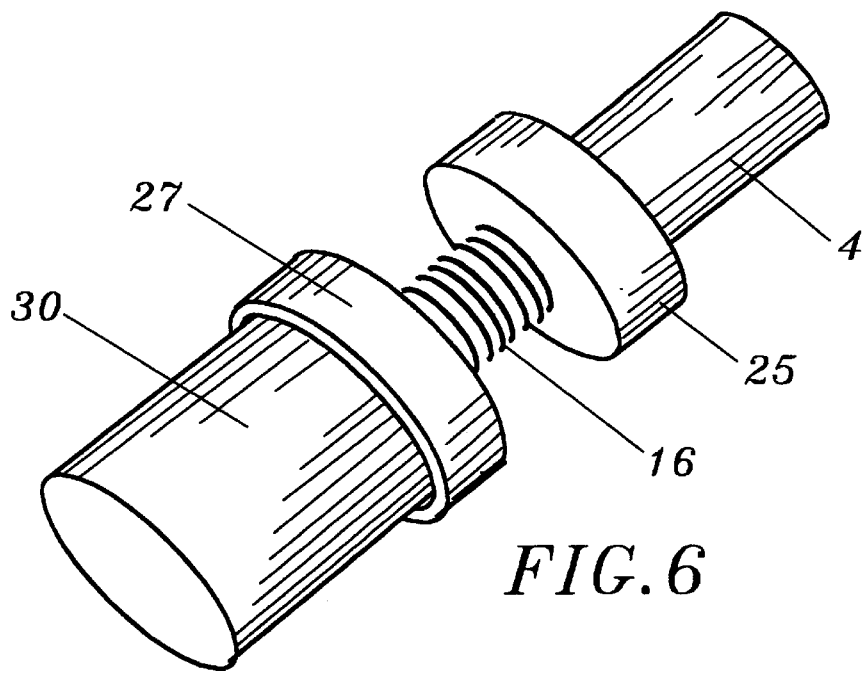
FIG. 6 illustrates a perspective view of the fish bait molder attached to a bait container.

The fish bait molder consists of a two part mold body having a separable mold cavity. The two part mold body may be opened and closed to allow insertion of a fish hook, molding of fish bait on the hook and removal of the baited hook. The mold body has an inlet passage to allow fish bait to be forced by means of a piston into the mold cavity for forming around the fish hook. The piston may be pressed against the fish bait by a threaded rotational means, a ratchet grip means or other suitable force means.

Referring to FIGS. 1 through 4, a generally cylindrical fish bait molder (1) has a first mold element (2) with inlet passage (3) and a second mold element (4) slideably mounted with the first mold element (2). Each mold element (2, 4) has a portion of the mold cavity (5) formed therein. As illustrated, the first mold element (2) has inlet cavity (6) formed therein and connected to the inlet passage (3) for purpose of introducing fish bait (7) into the mold cavity (5). The first mold element (2) also has access port (8) with line slot (9) for insertion and removal of a fish hook (10) including the molded fish bait (7).

The second mold element (4) has the cover cavity (11) and extended line slot (12) to close the mold cavity (5) access port (8) to and allow the fish hook line (13) to extend out of the fish bait molder (1). The mold elements (2, 4) are attached by a pin (14) and L shaped lock slot (15) such that the mold elements (2, 4) may be moved axially relative to each other and rotated to open, close and lock the fish bait molder (1). In this embodiment the lock slot (15) is formed in the first mold element (2) and the pin (14) is attached to the second mold element (4).

The first mold element (2) also has a cylindrical bait holder (16) with a bait cavity (17) defined therein and connected to the inlet passage (3). The bait holder outside wall (18) of the bait holder (16) is threaded to receive a threaded rotational injector (19). The rotational injector (19) has a piston (20) axially mounted therein which piston may slide longitudinally in the bait cavity (17). The piston (20) may have a ring (21), such as an O-ring or other suitable shape, to seal the piston (20) against the bait cavity wall (22). In this embodiment the piston (20) is attached to the rotational injector (19) by screw (23). When the mold elements (2, 4) are closed as illustrated in FIG. 2 and fish bait (7) is placed in the bait cavity (17) as the rotational injector (19) is rotated the piston (20) is forced into the bait cavity (17) thereby displacing fish bait (7). The fish bait (7) is forced through inlet passage (3) into mold cavity (5) and around fish hook (10).

As illustrated in FIG. 3 when the fish bait (7) is formed around the fish hook (10) the fish bait molder (1) is opened and the baited hook is removed through access port (8). As can be seen there is no need for the user to touch the fish bait (7). The fish bait molder (1) may be filled with fish bait (7) and carried by the user. When a fish hook (10) is to be baited the fish bait molder (1) is used. The fish bait molder (1) may even be filled with fish bait (7) by use of pre-filled cartridges

(24) having a cartridge wall (36) which slide into the bait cavity (17) further simplifying use while in the fishing environment. The piston (20) and ring (21) are sized to the force fish bait (7) from the cartridges (24).

The fish bait molder (1) may have a carry ring (34) for the convince of the user. Where necessary vent apertures (35) need to be provided to ease the operation of the injection means.

Referring to FIGS. 5 and 6, in this embodiment the fish bait molder (1) has relatively different diameter first mold element (2), second mold element (4) and bait holder (16). In this embodiment the first mold element (2) slides into the second mold element (4) and the pin (14) is attached to the first mold element (2) with the lock slot (15) formed in the second mold element (4). The location of the line slot (9), extended line slot (12) and access port (8) are also interchanged between mold elements (2, 4). The method of operation to open, close and lock the mold elements (2, 4) remains one of sliding and rotation relative to each other as can be seen.

In this embodiment the threaded outside wall (18) of the bait holder (16) has a rotational wheel (25) mounted and retained by set screw (26). There is also a threaded lid (27) threaded onto the bait holder (16). Attached or molded on the piston end (28) of the bait holder (16) is a disk (29). In this embodiment the fish bait (7) is forced directly out of the bait container (30) into the bait cavity (17). The bait container (30) is opened and the lid (27) is threaded onto the bait container (30) opening. The wheel (25) is then rotated forcing the disk (29) into the container (30) thereby applying pressure against the fish bait (7). The fish bait (7) is pushed through the bait cavity (17) into the mold cavity (5) to be molded to the fish hook (10) as described above.

Figure 7:
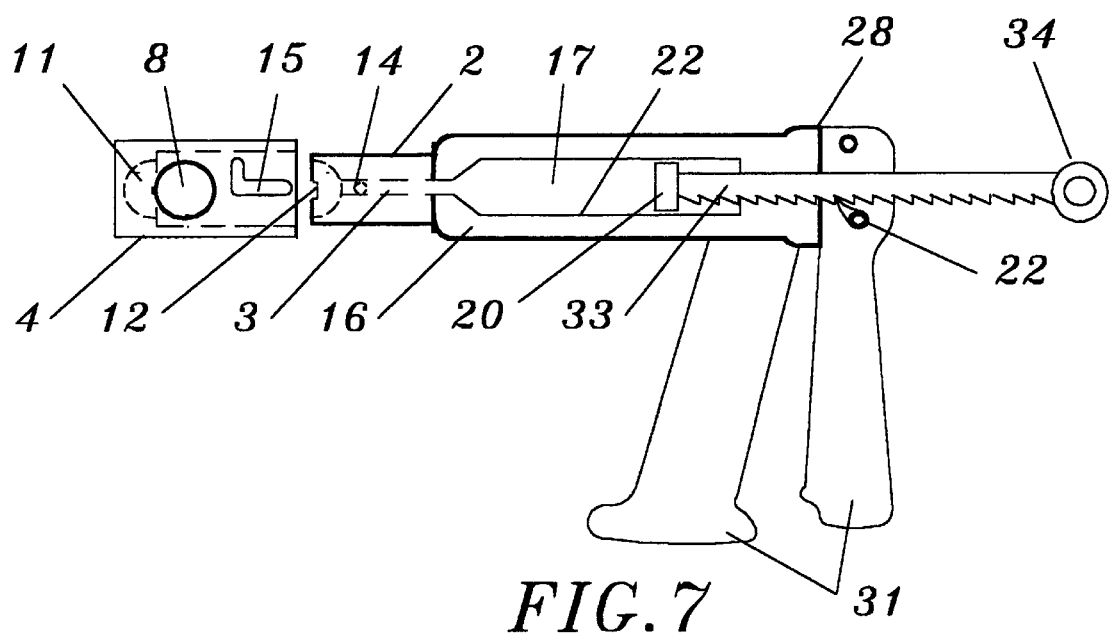
FIG. 7 illustrates a side view of the fish bait molder adapted for use with a ratchet actuated piston mechanism.

Referring to FIG. 7 an alternate means to force the fish bait (7) into the mold cavity (5) is illustrated. In this embodiment the bait holder (16) is not threaded, but rather is attached to a grip assembly (31) which has a ratchet mechanism (32) for operating the piston (20) having a saw tooth rod (33). As is commonly understood with such apparatus as the grip assembly is opened and closed the saw tooth rod (33) is moved into the bait cavity (17) causing the piston (5) to push fish bait (7) into the mold cavity (5).

I claim:

1. An apparatus for forming fish bait on a fish hook comprising:
   a first mold member having an inlet cavity connected to an inlet passage defined therein and the first mold member sized to be cooperatively assembled with;
   a second mold member removably engaged to the first mold member having a cover cavity defined therein including a means for closing and locking the first mold member and the second mold member thus defining a mold cavity therein;
   a means for inserting and removing a fish hook attached to a line with a molded fish bait;
   a bait holder attached to the first mold member and having a bait cavity defined therein which bait cavity is connected to the inlet passage; and
   a means for forcing a fish bait from the bait cavity through the inlet passage into the mold cavity.

2. The apparatus as in claim 1 wherein the means for inserting and removing comprises the first mold member having an access port and a line slot defined therein and the second mold member having an extended line slot defined therein such that when the mold cavity is open the fish hook may be inserted and removed through the access port and when the mold cavity is closed the line may pass through the line slot and the extended line slot.

3. The apparatus as in claim 1 wherein the means for closing and locking is a pin attached to the second mold member wherein the second mold member slides axially into the first mold member which has a lock slot defined therein in which the pin slides.

4. The apparatus as in claim 1 wherein the means for inserting and removing is the first mold member having an extended line slot defined therein and the second mold member having an access port and a line slot defined therein such that when the mold cavity is open the fish hook inserted and removed through the access port and when the mold cavity is closed the line passes through the line slot and the extended line slot.

5. The apparatus as in claim 1 wherein the means for closing and locking is a pin attached to the first mold member wherein the first mold member slides axially into the second mold member which has a lock slot defined therein in which the pin may slide.

6. The apparatus as in claim 1 wherein the means for forcing comprises:
   an outside wall of the bait holder threaded to receive a threaded rotational injector; and
   a piston attached to the threaded rotational injector such that the piston slides in the bait cavity when the threaded rotational injector is rotated so as to push against the fish bait contained therein.

7. The apparatus as in claim 6 wherein the piston includes a ring which touches and slides against a bait cavity wall.

8. The apparatus as in claim 6 wherein the bait cavity includes a cartridge containing fish bait mounted therein and the piston further including a ring which touches and slides against a cartridge wall.

9. The apparatus as in claim 1 wherein the forcing means comprises:
   an outside wall of the bait holder threaded with a wheel threaded thereon and retained by a set screw;
   a lid threaded on the outside wall such that it may be attached to a fish bait container wherein as the threaded wheel is rotated the bait holder is forced into the fish bait container; and
   a disk attached to a piston end of the bait holder which disk diameter is the inside diameter of the fish bait container.

10. The apparatus as in claim 1 wherein the forcing means comprises:
    a grip assembly attached to a piston end of the bait holder; and
    a ratchet mechanism in the grip assembly which engages a saw tooth rod having a piston attached wherein the piston slides axially in the bait cavity when the grip assembly is opened and closed.

11. The apparatus as in claim 10 wherein the piston includes a ring which touches and slides against a bait cavity wall.

12. The apparatus as in claim 10 wherein the bait cavity includes a cartridge containing a fish bait mounted therein and the piston further including a ring which touches and slides against a cartridge wall.

13. The apparatus as in claim 1 further comprising a carry ring attached.

14. The apparatus as in claim 1 further comprising a vent aperture defined therein.

15. A method of molding fish bait on a fish hook which comprises:

provided a first mold member and a second mold member which when closed together have a mold cavity defined therein;

inserting a fish hook through an access port;

providing a bait holder connected to the mold cavity by an inlet passage defined therein;

providing a means for forcing a fish bait from the bait holder having a bait cavity defined therein when filled with the fish bait;

filling the mold cavity with the fish bait and molding the fish bait on the fish hook within the mold cavity; and opening the first mold member relative to the second mold member for removal of the fish hook with the molded fish bait through the access sort.

16. The method as in claim 15 wherein the forcing means the fish bait is providing a threaded rotational injector threaded onto the bait holder which is rotated to advance a piston in the bait cavity to push the fish bait into the mold cavity.

17. The method as in claim 15 wherein the forcing means the fish bait is providing a lid threaded on the bait holder and closing the lid on a fish bait container such that rotating the bait holder pushes a piston end of the bait holder into the fish container to force the fish bait into the mold cavity.

* * * * *